United States Patent
Shuyingyu

(10) Patent No.: US 9,980,567 B2
(45) Date of Patent: May 29, 2018

(54) DIRECTIONAL AND GAS PERMEABLE CLEAR PROTECTIVE COVERING FOR PERMANENT INSTALLATION ON STONE COUNTERTOPS

(71) Applicant: Prestige Film Technologies, San Jose, CA (US)

(72) Inventor: Sammy Shuyingyu, Dublin, CA (US)

(73) Assignee: PRESTIGE FILM TECHNOLOGIES, San Jose, CA (US)

( * ) Notice: Subject to any disclaimer, the term of this patent is extended or adjusted under 35 U.S.C. 154(b) by 176 days.

(21) Appl. No.: 14/995,926

(22) Filed: Jan. 14, 2016

(65) Prior Publication Data

US 2016/0128479 A1 May 12, 2016

Related U.S. Application Data

(63) Continuation-in-part of application No. 13/754,836, filed on Jan. 30, 2013, now abandoned.
(Continued)

(51) Int. Cl.
*A47B 96/18* (2006.01)
*B32B 7/12* (2006.01)
(Continued)

(52) U.S. Cl.
CPC .......... *A47B 96/18* (2013.01); *B32B 7/12* (2013.01); *B32B 9/002* (2013.01); *B32B 9/045* (2013.01); *B32B 27/36* (2013.01); *B32B 27/40* (2013.01); *C09J 5/02* (2013.01); *C09J 7/26* (2018.01); *B32B 2255/00* (2013.01); *B32B 2255/10* (2013.01); *B32B 2264/0207* (2013.01); *B32B 2264/10* (2013.01); *B32B 2264/12* (2013.01);
(Continued)

(58) Field of Classification Search
None
See application file for complete search history.

(56) References Cited

U.S. PATENT DOCUMENTS 3,795,533 A 3/1974 Gauri
4,810,533 A 3/1989 Smith
(Continued)

FOREIGN PATENT DOCUMENTS

EP 1837319 A2 9/2007
EP 1946832 A1 7/2008
(Continued)

*Primary Examiner* — Frank D Ducheneaux
(74) *Attorney, Agent, or Firm* — David R. Stevens; Stevens Law Group

(57) ABSTRACT

A single direction gas permeable protective covering material for protecting solid stone surface countertop materials is provided. The protective covering material includes a core layer which is formed as an elongate thin sheet of material having uniform thickness. The protective covering material also includes an outer protective layer attached to a first side of the core layer and a dual layer adhesive system attached to a second side of the core layer. The protective covering material includes cone shaped pores therethrough that are gas permeable to allow for out-gassing of stone countertop materials. The protective covering material is designed to be permanently attached to a porous stone countertop material with the dual layer adhesive system to protect the countertop material from damage during daily use.

20 Claims, 3 Drawing Sheets

Related U.S. Application Data

(60) Provisional application No. 61/593,206, filed on Jan. 31, 2012.

(51) Int. Cl.
| | |
|---|---|
| *B32B 27/36* | (2006.01) |
| *B32B 27/40* | (2006.01) |
| *C09J 4/00* | (2006.01) |
| *C09J 5/02* | (2006.01) |
| *C09J 7/26* | (2018.01) |
| *C09J 7/30* | (2018.01) |
| *B32B 9/00* | (2006.01) |
| *B32B 9/04* | (2006.01) |

(52) U.S. Cl.
CPC ..... *B32B 2307/30* (2013.01); *B32B 2307/306* (2013.01); *B32B 2307/412* (2013.01); *B32B 2307/558* (2013.01); *B32B 2307/714* (2013.01); *B32B 2307/724* (2013.01); *B32B 2307/7265* (2013.01); *B32B 2419/00* (2013.01); *B32B 2479/00* (2013.01); *C09J 4/00* (2013.01); *C09J 7/30* (2018.01); *C09J 2201/36* (2013.01); *Y10T 156/10* (2015.01); *Y10T 428/26* (2015.01); *Y10T 428/2848* (2015.01); *Y10T 428/31678* (2015.04); *Y10T 428/31797* (2015.04)

(56) References Cited

U.S. PATENT DOCUMENTS

| | | |
|---|---|---|
| 4,869,922 A | 9/1989 | d'Agostino |
| 4,933,082 A | 6/1990 | Yamada |
| 7,828,889 B2 | 11/2010 | Russell |
| 2002/0132871 A1 | 9/2002 | Colton |
| 2008/0280061 A1 | 11/2008 | Questel |
| 2009/0053448 A1* | 2/2009 | Paiva ................ A47G 27/0206 428/41.3 |
| 2009/0301027 A1 | 12/2009 | Pelletier |
| 2013/0115375 A1 | 5/2013 | Howe |

FOREIGN PATENT DOCUMENTS

| | | |
|---|---|---|
| WO | WO2008125969 A2 | 10/2008 |
| WO | WO2009138945 A1 | 11/2009 |
| WO | WO2011026936 A2 | 3/2011 |
| WO | WO2011110705 A1 | 9/2011 |

* cited by examiner

DIRECTIONAL AND GAS PERMEABLE CLEAR PROTECTIVE COVERING FOR PERMANENT INSTALLATION ON STONE COUNTERTOPS

RELATED APPLICATIONS

The present application is a continuation-in-part of U.S. patent application Ser. No. 13/754,836, now abandoned filed Jan. 30, 2013, which is incorporated herein in its entirety, and which claims the benefit of U.S. Provisional Patent Application Ser. No. 61/593,206, filed Jan. 31, 2012, which is incorporated herein in its entirety.

BACKGROUND INFORMATION

Field of the Disclosure

The present invention relates to the protection of stone countertops. In particular, examples of the present invention relate to a directional gas permeable protective covering for application to solid natural and man-made stone surface countertops to protect the stone countertop from damage during daily use in kitchens and bathrooms.

Overview of the Invention

Many consumers have adopted solid stone surface countertops made of natural or man-made stones such as, but not limited to: marble, granite, icestone, vetrazzo, limestone, quartz, soapstone, caesarstone, etc. These materials have become increasingly common in applications such as residential kitchens and bath countertops, tables, commercial tables and counters. With greater use of stones in these settings, there remains a need for maintenance on a regular basis due to the high porosity and high liquid absorbency of stone. These materials provide an increased level of beauty to the consumer, but come with upkeep requirements that are not enjoyable to some owners. Even with proper care, stone countertop materials often begin to show wear, damage, stains, etching, and the like. Stains may include surface markings from common organic or inorganic foods and liquids. Stains are relatively simple to remove. Etching, on the other hand, is discoloration and dulling of the stone from exposure to common organic or inorganic foods and liquids that have seeped through the stone surface and damaged the stone surface. In order to remove etched parts of stone, professional tradesmen in stone fabrication or restoration would need to polish the stone with abrasives utilizing a high-speed rotary polishing machine. A difference between staining and etching stone is often the amount of time organic or inorganic foods or liquids have been left on the surface of the stone.

Etching and staining stone countertops often occurs due to the porosity of the stone, which may have pores ranging from 25 um-260 um in diameter. Porous valleys and fissures (also known as "veins") can span the entire piece of stone countertop, making it highly susceptible to staining and etching. In addition, certain known chemicals in food additives, food enhancers, drinking water, and common household cleaners have acids such as hydrogen chloride (HCl), which is damaging to many types of stone if left on the stone surface. The present invention provides a clear protective covering which protects stone countertops. Known clear protective films have significant negative impacts to stone countertop degradation due to the inability of the stone to outgas.

The presently disclosed protective film may possess the following identified qualities that are beneficial to a stone surface:

1. Breathability/Gas Permeability: The protective film should be gas permeable and allow for proper outgassing and vapor release from the stone. Moisture migrating through the stone is called "Moisture Vapor Transmission". Stone has an internal structure that is not absolutely solid. There are two physical properties found in stone: pores and capillary structures that are interconnected. The structure, size and orientation of these networks affect the degree which moisture can migrate by capillary action through the stone. If natural vapor transmission is not allowed to take place (as will be the case if covered by a non-gas permeable hard coated type film), the moisture gets trapped and can cause chemical, mineralogical, and structural changes within the stone. This action of decay in stone may take the form of pitting, cracking, discoloration, and flaking.
2. Heat Protection: The protective film should provide a means to disperse heat when it comes into direct contact with a heated object such as hot pots, hot pans, boiling water, hot oil splashed from cooking, etc. Excessive heat from direct contact being concentrated on a singular area can cause discoloration and cracking of the stone.
3. Proper Adhesion: Known adhesive structures are created to adhere to flat/smooth surfaces. Stone countertop surfaces, (which may seem flat and smooth in many instances), actually have fissures, pores, and irregularities that make traditional adhesive systems non-ideal. Uneven surfaces, air gaps, and visible distortions are created when these adhesives are used. These visual distortions are great detractions to the overall aesthetics of the stone material and in many cases prevent proper bonding to the stone surface material.
4. A protective film should provide protection against common household chemicals. Since stone counters are often used in bars, kitchens, and bathrooms, they will come into constant contact with household chemicals and acidic liquids such as lemon, lime, vinegar, coffee, wine, alcohol, calcium deposits in hard water, and surface cleaners. A stone surface protection film will come into contact with these same chemicals and liquids as well, hence the need for it to serve as an impenetrable barrier from them. A stone surface protection film should allow the stone surface material to outgas, yet be impervious to liquid and chemical penetration.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
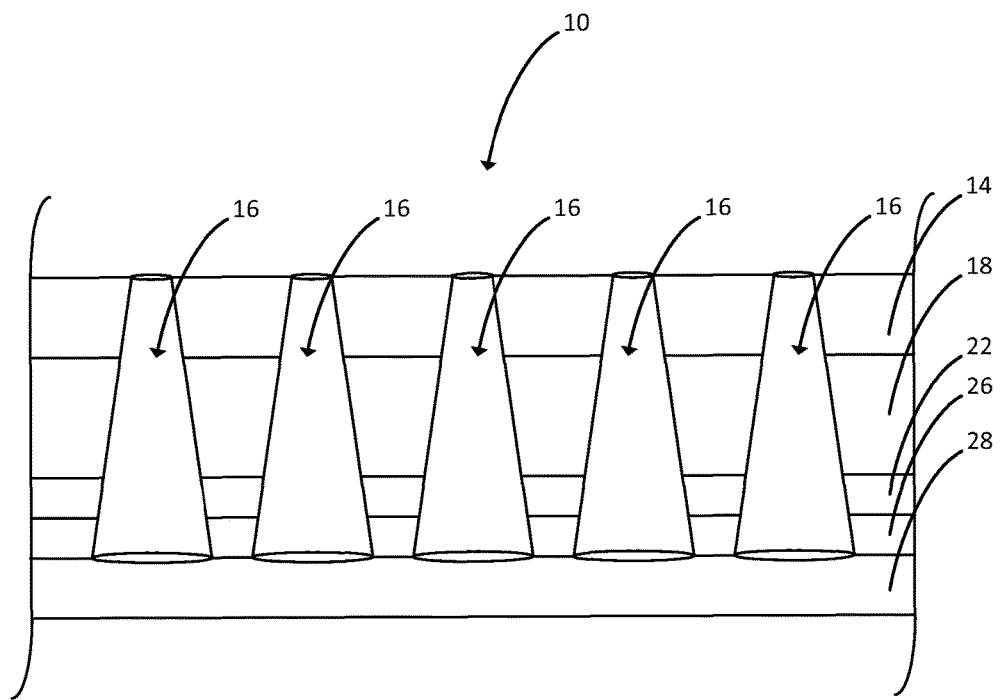
FIG. 1 is a side view illustrating a protective covering material according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of the protective film elements in the figures has been exaggerated relative to the dimensions of other elements such as the stone surface and pores in the stone surface to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The disclosure particularly describes a protective covering for solid stone surface countertop materials and how such a covering may be installed and used to protect a solid stone surface countertop material. The covering may be a clear covering material with a specific construction designed to have unique protective capabilities applicable to a stone countertop. The top layer consists of a clearcoat designed with micro-openings with a porosity rating of 0.7 u-0.10 u. The present invention also has a construction throughout with inclusions of Nano Cone Shaped Pore Chambers that are uniquely designed to allow for gas permeability, yet be impenetrable from chemicals harmful to stones countertop materials. A stone surface protection film should be gas permeable, hence the need for micro pores that can allow vapor release from the stone surface. The clearcoat is constructed of Micro Nitrile Rubber (NBR) nano resin particles rated at 20 nm-30 nm with a range between 3%-10%, but not more than 10% so to avoid affecting the integrity of the liquid gloss factor, clarity, and gas permeability of the coating. Another element in the clearcoat is the deposition of crystallized limestone particles rated at 20-50 nm rated at 5%-12%. The Micro Rubber resins and crystallized limestone particles can achieve chemical etch resistance from commonplace chemicals such as, but not limited to: citrus acids, lime, ammonia, bleach, calcium, and other forms of organic or inorganic liquids commonly found in kitchens or bathrooms. These common chemicals react negatively to stone surfaces and create etchings and dulling of stone surface with ease.

The covering may include multiple specific layers to provide beauty, gas permeability, breathability, durability, protection from acids and liquids, protection from impacts, a temperature tolerance up to 350 degrees Fahrenheit, and convenient installation. The protective covering protects stone countertops from daily abuse and does not detract from the overall appeal of the countertop. The protective covering is particularly suited for use with solid stone surface countertops such as, but not limited to: marble, granite, limestone, quartz, sustainable stones, caesarstone, etc.

As discussed herein, solid stone countertops include natural and manmade materials. Natural solid stone surface countertop materials such as marble, granite, limestone, quartz, etc. Man-made countertop materials include stones such as Caesarstone, sustainable countertops such as Icestone and Vetrazzo and composite materials such as quartz or other stone pieces in a mortar, grout, or cement binder, decorative elements including stone, etc. in a binder, acrylic and polyester blends, and the like. These decorative and other similar stone countertop materials are frequently referred to collectively as solid stone surface countertop materials, solid stone surface countertops, or stone countertops in the present application.

These solid stone surface countertops may be used in various different applications. These stone countertop materials are often used in residential counters, backsplashes, bars, showers, vanities, work surfaces, tables, furniture, etc. These stone countertop materials are also used in similar commercial applications such as countertops, tables, and the like in restaurants, store displays, etc. These applications are frequently referred to collectively as 'stone countertops' in the present application.

Daily use of these solid stone surface countertop materials frequently includes contact with tools such as kitchen utensils, bowls, cups, plates, purses or bags, electronic devices, etc. which will mechanically damage the countertop material. These countertop materials are also frequently exposed to contaminants such as organic liquids, dirt, foods, cooking oils, and the like which will stain and etch the stone countertop material. The stainings and etchings would leave dull patches (such as those left through condensation on the base of glasses and discoloration to those areas exposed to liquids. Inorganic chemicals such as ammonia, vinegar, hydrochloric acid, and citrus extract are commonly used in kitchen or bathroom cleaners. These chemicals react aggressively to many stone countertop materials that will leave the stone corroded and matte in finish. Many other liquid contaminants chemically damage the countertop material. This chemical damage includes hard water etching, and chemical etching (often from orange juices, lime juices, coffee, tomato juice, wine, and other acidic liquids). Chemical etching can wear down the countertop material, rendering it aesthetically unpleasant as well as damaging the countertop surface and in some cases, weakening the countertop material structurally. This chemical damage can promote mechanical damage such as chipping, oxidation, fading, corrosion, and cracking. In order for stone countertops to be repaired or for etchings to be removed, a stone restoration and/or fabrication tradesmen would be hired to perform extensive polishing of the stone, which is a laborious process that requires masking of surrounding areas in the kitchen or bath from the chemicals used in conjunction with a rotary high speed buffer. Polishing may result in chemical dust formation that may render a kitchen or bath uninhabitable from hours to days depending on the extent of the stone restoration.

Additional damage to these countertop materials may include fading, chemical etchins, oxidation, corrosion, surface dullness, and degradation of the countertop material from exposure to common organic liquids such as, but not limited to wine, juice, lemon and inorganic liquids such as, but not limited to bleach, cleaning agents, ammonia, vinegar, and citrus cleaners. It is widely known that certain juices are acidic in nature that can result in extensive damage to stone countertops. Juices, coffee, wine and other organic liquids can stain and etch deep into the stone. This etching will have a matte and colored finish, which if these chemical elements are left on the surface for an extended period of 15 minutes or more, can become difficult to remove and may then require a professional restoration tradesmen to repair. In some cases, this damage may require restorative measures such as grinding, polishing, and resin filling that can be costly. In some instances, replacement of the countertop material may be necessary as the material may become hazy, weakened, or discolored from improper care and the damage associated with environmental exposure and daily use. Presently, there is currently a wide range of chemical sealers or waxes designed for stone countertops, but they come with known drawbacks. They are often toxic in nature to human consumption and having these chemicals applied to kitchen countertops where food is consumed can be hazardous to health. Additionally, these chemical sealers are typically required to be applied 1-2 times per year.

Figure 2:
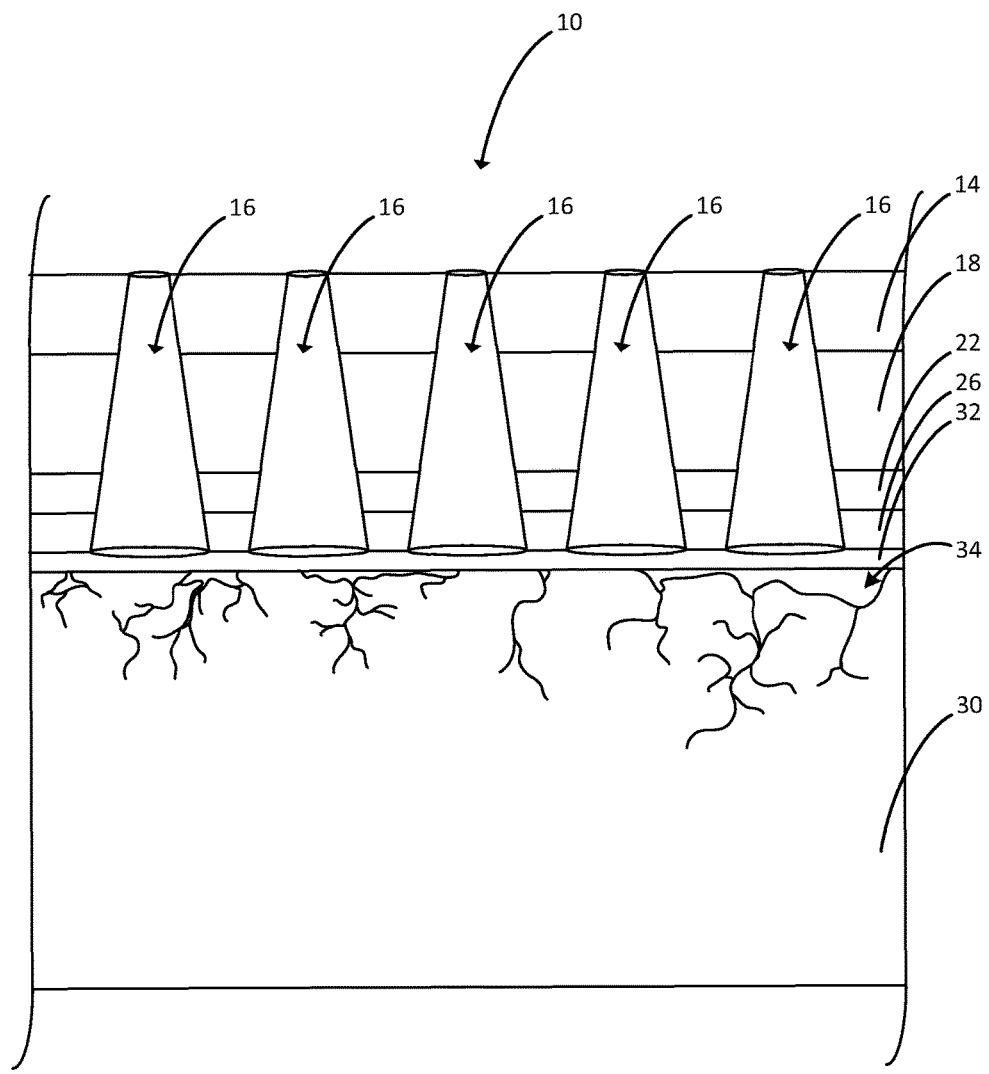
FIG. 2 is another side view illustrating the protective covering material during installation on a stone countertop.
Figure 3:
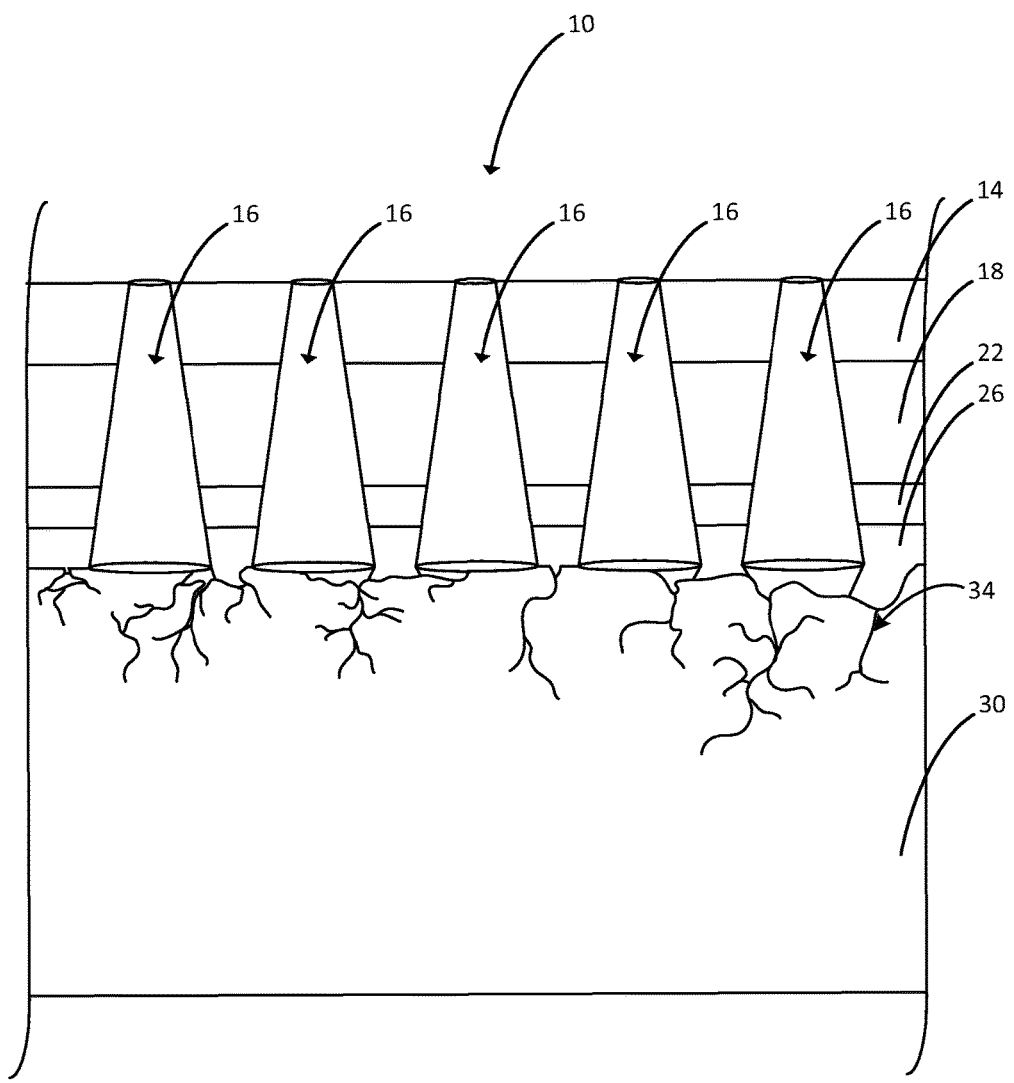
FIG. 3 is another side view illustrating the installed protective covering material and stone countertop.

Referring to FIGS. 1 through 3, a protective covering material 10 for solid stone surface countertops, also referred to herein as a film 10 or film construct 10, is shown. FIG. 1 shows the protective material 10. FIG. 2 shows the material 10 during installation on a stone countertop 30 (also referred to herein as a countertop surface 30 or stone 30). FIG. 3 shows the installed protective material 10 and countertop 30. The protective material 10 may include multiple layers. The protective covering material 10 may include a first layer 14 that is a durable clear coat with heat dispersing and micro-openings with a porosity rating of 0.7 u-0.10 u (0.7 to 0.1 um). The first layer 14 may also be referred to herein as an outer layer 14, or a top coat layer 14. The first layer 14 may be a durable clear coat which is heat resistant and includes gas permeable cone shaped pores 16 which extend through the covering material 10. The cone shaped pores 16 have an upper, outside opening which is small and a larger opening near the base of the film and allow gasses to move efficiently out of the stone material.

In one example, the outer layer may be formed from deposits of Micro Nitrile Butadiene Rubber (NBR) resin particles with a size between 20 nm-30 nm with a composition range between 3%-10% of the outer layer 14 by weight, to maintain the clarity of the layer 14. The outer layer 14 may also include crystallized limestone particles with a size between 20-50 nm and a composition between 5%-12% of the outer layer by weight. The outer layer 14 may include colloidal silica at a composition between 10% and 20% of the outer layer 14 by weight, and more preferably about 20% by weight. The outer layer 14 may include 1,3 butadiene homopolymer which is hydroxyl terminated at a composition between 15% and 25% by weight, and tetrakis ydroxymethyl phosphonium chloride at a composition of about 7% by weight. The balance of the outer layer 14 may by aliphatic diisocyanates. A ketone solvent such as methyl ethyl ketone may be used to dissolve the outer layer and allow the outer layer 14 to be applied wet (such as by spraying) to a core layer 18 (also referred to herein as a second layer 18, an inner layer 18, or a center layer 18). The example outer layer 14 is a polymer layer which includes butadiene-rubber resin particles and crystallized limestone particles for durability and temperature resistance.

The protective covering material 10 may include a second layer 18 which forms the core substrate of the covering material 10. The second layer 18 may be made of a polymer such as a urethane or polyethylene terephthalate.

The second layer 18 may provide mechanical strength to the stone protective covering material. As such, the second layer 18 may provide sufficient strength to support the first layer 14 and may provide sufficient mechanical strength to apply the protective covering material 10 to a solid surface countertop and otherwise work with the covering material 10. As is seen, the pores 16 extend through the second layer 18, and typically extend through the entire thickness of the protective material 10.

Known prior art optical films and multi-layered films which achieve heat resistance and durability through the inclusion of high crystallinity polymers and resins creates a non-gas permeable substrate which is detrimental to a stone surface.

The second layer 18 has, within its construction, a means to allow vapor and gas release, therefore giving it gas permeability qualities that are essential for stone surfaces. In the second layer 18, there are structural nano-cone shaped pore chambers which extend through the protective material 10. The inclusions of micro cone shaped pore chambers extend through the entire structure layer, and connecting through all layers of the material 10. The purpose of these pore chambers is to allow for the gas and vapors from the out-gassing process of the stone to be uninhibited. The cone pores 16 are shaped in such a way that the larger base openings are positioned at the bottom at the stone surface and the narrowed top micro openings are positioned at the top of the outer layer 14. This allows the gas to gather from the bottom and creates an upwards directional release of the gas and vapors. The gases are funneled through the micro pores in all layers of the material 10, therefore allowing the stone surface to breathe naturally. If stone is not allowed to outgas, structural integrity will be compromised and will result in dulling, discoloration, oxidation, corrosion, and potential cracking of the stone.

The construction of the second layer 18 also has a heat dispersion function. When a direct heat source such as a hot pan is removed from a stove and placed directly on top of the film 10, heat is dispersed within the cooled gases in the pore chambers, hence, directly cooling the surface temperature of the film. Without such a system in place, heat will be absorbed into a more focused area, which can crack and damage the underlying stone.

The cone shaped pores 16 have an upper opening of about 10 um in size, and are spaced out with about 20 um space between adjacent pores. In one example, the pores may be created by rolling the film construct 10 with a roller which has micro cone shaped spikes that punch through the film layers. The cone shaped micro pores allow the stone to outgas but also effectively prevent liquids from contacting the stone as the pore size does not allow liquid penetration.

The protective material 10 is typically manufactured by creating a core layer 18 of urethane, etc. The core layer 18 is coated with top coat layer 14 via wet coating deposition; preferably spray coating or roll coating and the outer layer 14 is allowed to cure. An inner adhesive layer 22 is applied to bottom side of the core layer 18 (i.e. the side which is not top coated with the outer layer 14) via a method of wet coating deposition, preferably spray coating or roll coating and allowed to cure in de-staticized UV clean room. After the inner adhesive layer 22 is cured, the outer adhesive layer 26 is applied to the bottom side of the inner adhesive layer 22 (i.e. the side that is not in contact with the core layer 18). The outer adhesive layer 26 is applied onto the inner adhesive layer via a method of wet coating deposition;

preferably spray coating or roll coating and allowed to cure. After the outer adhesive layer 26 is cured, the protective film 10 in whole with all layers attached and cured is fed through a pore compression press where nano cone shaped pore chambers are embedded into the protective film using a rolling compression press die. The rolling press die is a cylindrical metal alloy die with nano sized extrusions in the shape of the cones, with each cone shaped extrusion evenly spaced. The cone shaped extrusions may each have a bottom diameter of approximately 20 um and top diameter of approximately 10 um. These cone shaped extrusions form the cone shaped pores 16 in the protective material 10. After the creation of the cone shaped pore chambers 16, a release layer 28 of PET or LDPE material, for example, is applied to the bottom side of the outer adhesive layer 26 to protect the adhesive layer 26 and protective film 10 until installation.

Known gas permeable films are typically highly water and gas permeable and gas permeability is achieved through larger perforations and openings within the film, which allows for water and vapor release, but also allows for the penetration of moisture and water into the film as well. These would not be suitable for stone countertops as they would not adequately protect a stone surface.

The protective covering material 10 may include a dual-layered adhesive system. The dual-layered adhesive may also include the microscopic cone pores 16. The dual-layered adhesive system may include an inner layer of adhesive 22 which is adhered to the second, core layer 18 and an outer layer of adhesive 26 which contacts the stone countertop surface 30.

The outer-most layer 26 of this adhesive contains agents that will react to a pre-determined liquid installation gel 32. This pre-determined liquid installation gel will create an emulsion process that will revert this outermost adhesive layer 26 to an uncured state so it may melt into the pores and capillary fissures of the surface of the stone countertop 30. In the temporary uncured state, there becomes a process of polar attraction to uneven surface areas such as the pores and capillary fissures of stone. This temporary process of the uncured state will naturally revert back to a cured state in 30-45 minutes as the installation gel evaporates. The outer-most layer of the adhesive is 3-5 um in thickness and contains crystallized acrylic acid particles to react with the pre-determined installation gel. If the outermost layer 26 is beyond 5 um, then this would negatively affect gas permeability with the stone 30, so it is desirable to keep the outer layer 26 of the adhesive blow 5 um in thickness.

The inner adhesive layer 22 is typically between 17-19 um thick. This will allow proper bonding of the film to the stone surface while the outer adhesive layer is in its uncured state. Conventional acrylic or silicone adhesives will fail when applied to stone surfaces due to high porosity of stone.

In one example, the inner adhesive layer 22 includes silicone, thermoplastic elastomers, polyurethane anaerobic, epoxy, phenolic, polyimide, hot melt, butyl-based, plastisol, polyvinyl acetate (PVA), sulfur, methylbenzene (solvent) 1.5%, and phosphites. The outer adhesive layer 26 may include polyhexamethylene adipate, methylbenzene, ethylene-vinyl acetate, and epoxy. The inner layer 22 and the outer layer 26 of adhesives may be bonded to each other by a layer of plasticized primer.

The design element of cone shaped pores in both layers of the adhesive is for the breathability of the stone surface. Stones inherently need to breath or outgas through the pores and capillary fissures. If stone is not allowed to outgas, oxidation and discoloration will render the stone visually unappealing and will cause permanent damage to the stone's structure. The stone protective covering's dual layer cone adhesives will allow the stone to outgas in order to provide a protective layer that does not harm the stone. The dual adhesive layer system also allows the film to adhere property with the stone surface material without creating distortions from the pores and fissures of the stone.

The protective covering material 10 may be applied to a stone countertop 30 using a pre-determined liquid installation gel 32 and tools such as a squeegee. The installation gel may include, by weight, 5% to 10% of methyldidecylamine, 3% to 5% of acetone, about 20% of isopropyl alcohol, about 6% of cocamidopropyl betaine, and about 60% of water.

FIG. 2 shows the protective material 10 during the installation process. During installation, the surface of the stone 30 is cleaned and prepared. The stone surface may be cleaned mechanically while using a stone cleaner and then dried. A piece of stone protection material 10 is cut to shape to cover the piece of stone 30. A light, even coat of the installation gel 32 is applied to the stone, such as by spraying the gel onto the stone 30. The bottom release liner is removed from the protective material 10 and the protective film 10 is placed onto the stone countertop in contact with the installation gel. After about 30 seconds of contact between the installation gel 32 and the outer adhesive layer 26, the installation gel will being the outer adhesive layer 26 into a partially uncured state. A squeegee may be used to push excess installation gel out from under the protective film 10 and push the protective film 10 into contact with the stone countertop 30. The applied pressure will push the partially uncured outer adhesive layer 26 into surface pores and fissures in the stone countertop 30; conforming the outer adhesive layer 26 to the shape of the pores of the stone 30. This creates a good bond to the stone. Conventional adhesives will simply extend across the top of pores and fissures in stone and leave a void which becomes a point where the conventional film delaminates from the stone. The outer layer 26 of adhesive is allowed to cure for about an hour before placing any objects on the surface of the stone 30 and protective film 10. FIG. 3 shows the installed film 10. As indicated at 34, the outer layer of adhesive 26 fills into surface pores and fissures.

With the dual layered adhesive having specific cone shaped pore chambers with size of 1-5 um, this system solves several issues with proper adherence of a protective material to stone surfaces. Applying a clear film without an adhesive designed to allow gas permeability of stone surfaces will damage the stone itself through oxidation, cracking, discoloration, and the permanent change of its internal structure. The protective film 10 avoids this. The dual layered adhesive system is activated so that the outermost layer 26 is brought to an uncured state via the installation liquid gel. The installation gel contains: acetone 3%-5%, isopropyl alcohol 20%, water, and cocamidopropyl betaine 6% and reacts with the acrylic acid particles in the outer layer of adhesive 26 to melt this layer into the pores and fissures of the stone. This allows for proper adhesion. Without such a system, known clear film will delaminate over time and render its protective capabilities useless. The boding of the adhesives with surface pores in the stone results in a surface stone protective film that mimics the fissures and pores of the stone and maintains a more natural look. This also solves the issue of having air gaps over these pores and fissures when traditional adhesive construction types are used. The protective covering material 10 may be constructed in such a manner that the first layer 14 includes a durable impact absorbent and high temperature resistant clear coat. Impact absorbance and dispersion is achieved only through low energy impact such as when a bowl or cup is dropped from a close distance from the stone countertop surface. The Cone Shaped Pore Chambers provides little flex and micro nitrile butadiene rubber resins within the outer coating layer provides low energy dispersion.

The protective covering material 10 may be designed for application to various different stone countertop materials. The materials should meet certain criteria for the protective covering material to be applicable due to its entire structure. 1) The countertop should be of stone material 2) the surface should be porous. As such, the protective covering material may be provided in varying thicknesses. According to one embodiment, the protective covering material 10 may be provided in varying thicknesses between 0.002 inches thick and 0.020 inches thick. For optimal protective capabilities and proper outgassing of stone, the product should have a total thickness between 0.004 inches thick and 0.007 inches thick. These different thicknesses may each provide similar protection properties. As such, the varying thicknesses may each provide chemical protection, tolerance to high heat, impact resistance, and gas permeability.

The protective covering material 10 is typically provided in uniform thin sheets having sufficient width and length to cover a desired stone countertop or surface. In one embodiment, the protective covering material 10 may be provided with a glossy clear or matte clear surface finish and may thus complement various different stone countertop materials and finishes. The protective covering material 10 may provide a satin or a high gloss surface that will typically enhance the appearance of a high grade countertop material such as polished and honed stone. The protective covering material 10 is typically transparent and retains the appearance and appeal of a countertop material such as natural or man-made stone. The protective covering material 10 strengthens these stone countertop materials as it provides greater resistance to chipping, breaking, temperature, staining, etching, etc.

In one example, a protective film covering is provided to protect the surface of solid stone surface countertop materials in both commercial and residential areas such as kitchen countertops, bathroom sinks, showers, and bathroom walls from damage such as chipping, chemical and hard water etching, etc. As water chemicals and calcium levels (which directly affect "hardness" levels) have a wide variance throughout water utility companies, hard water etching is prominently an issue with stone surfaces due to the high porosity of stone.

The outer layer 14 is both chemically resistant to common liquids such as citrus juices, coffee, tomato juice, wine, and other acidic liquids as well as temperature resistant. The outer layer 14 has a high tolerance to heat from physical contact such as hot pots and pans, and can handle contact temperatures up to 350 degrees Fahrenheit. The outer layer 14 can handle contact with temperatures up to 250 degrees Fahrenheit for up to 30 minutes without scorching or signs of degradation.

Stone naturally has valley fissures and capillaries that are interconnected to openings of pores. These pores of stone are known to expand and contract based on temperature. With exposure to heat near stoves, the capillaries and pores will open, exposing the stone surface to deep etchings from cooking oil, organic liquids, and other food items. In the kitchen, deep chemical etchings are more prone in and around the proximity of the stove areas. With heat, stone pores increase in diameter and allows for further etchings from food bi-products and liquids. The protective material 10 both seals the stone pores as well as provides protection from the effects of the high temperature.

Once installed, the protective covering material 10 requires minimal maintenance and retains the natural look of the stone countertop material. As the clarity of the protective covering material 10 is of high importance, each component of this film is designed for maximum clarity. In this manner, the protective covering material 10 is aesthetically pleasing when it is installed onto the countertop material. As such, the structural make up of the protective covering 10 is of utmost importance. From an adhesive system that fills the pores of the stone surface to mitigate the issues of having bumps, raised surfaces, and air gaps which creates an unsightly finish, to a gas permeable make up, all of which works hand in hand to protect the underlying stone surface without any negative compromises. The stone surface retains its appearance and in some cases is visually improved by the consistency of the surface provided by the protective covering material 10. The physical, chemical, and high heat tolerance of the protective covering material 10 will protect the stone countertop material and preserve the beauty of the countertop material.

The protective covering material typically eliminates the need for using coasters, place mats, and the like. The protective covering material eliminates the frequent application of stone sealers and other chemical treatments. This reduces the amount of chemicals used and reduces the work necessary for preserving the countertop material. The protective covering also eliminates the need of having a stone restorer provide heavy polishing and grinding of the stone surface to remove chemical etchings. The protective covering material 10 provides surface and edge protection to a stone countertop material without obstructing the beauty of the countertop.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific materials, thicknesses, etc., are provided for explanation purposes and that other structures may also be employed in other embodiments and examples in accordance with the teachings of the present invention.

What is claimed is:

1. A system comprising:
   a generally smooth stone surface having pores therein;
   a protective film material comprising:
   a core layer defining an elongate thin sheet having generally uniform thickness;
   an adhesive system comprising:
   an inner adhesive layer attached to the core layer, the inner adhesive layer being made from a first adhesive;
   an outer adhesive layer attached to the inner adhesive layer so that the outer adhesive layer is attachable to the stone surface, the outer adhesive layer being made from a second adhesive which is different from the first adhesive;
   an installation gel which is applied between the stone surface and the outer adhesive layer to install the protective film material; and
   wherein the installation gel brings the outer adhesive layer into an uncured state after contact with the outer adhesive layer.

2. The system of claim 1, wherein the outer adhesive layer is attachable to the stone surface such that the outer adhesive layer substantially fills surface pores on the stone surface.

3. The system of claim 1, wherein the outer adhesive layer comprises crystallized acrylic acid, and wherein the installation gel reacts with the crystallized acrylic acid to bring the outer adhesive layer into an uncured state.

4. The system of claim 3, wherein evaporation of the installation gel returns the outer adhesive layer to a cured state.

5. The system of claim 3, wherein the installation gel comprises methyldidecylamine, acetone, isopropyl alcohol, and cocamidopropyl betaine.

6. The system of claim 1, wherein the protective film material further comprises an outer layer attached to the core layer on a side of the core layer opposite the inner adhesive layer.

7. The system of claim 6, wherein the outer layer comprises crystallized limestone particles and nitrile rubber resin particles.

8. The system of claim 7, wherein the crystallized limestone particles are between about 20 nm and about 50 nm in size and comprise between about 5 percent and about 12 percent of the outer layer by weight and wherein the nitrile rubber resin particles are between about 20 nm and about 30 nm in size and comprise between about 3 percent and about 10 percent of the outer layer by weight.

9. The system of claim 6, wherein the protective film material comprises pores formed through the protective film material.

10. The system of claim 9, wherein the pores are disposed substantially perpendicular to a surface of the protective film material.

11. The system of claim 10, wherein individual pores are formed with a first opening on an outer surface of the protective film material and a second opening on an inner surface of the protective film material, and wherein the second opening is larger than the first opening.

12. The system of claim 10, wherein individual pores are formed with a first opening on an outer surface of the protective film material, and wherein the first opening is about 10 um or less in size.

13. The system of claim 10, wherein the pores extend through each layer of the protective film material.

14. The system of claim 10, wherein the pores are cone shaped, having a first opening on an outer surface of the protective film material and a second opening on an inner surface of the second adhesive layer which is larger in size than the first opening.

15. A system comprising:
a generally smooth stone surface having pores therein;
a protective film material comprising:
    a core layer defining an elongate thin sheet having generally uniform thickness;
    an outer layer attached to an outer side of the core layer;
    an adhesive system attached to an inner side of the core layer; and
    pores formed through the protective film material, the pores extending substantially perpendicular to a surface of the protective film material and through each of the core layer, the outer layer, and the adhesive system, and wherein individual pores are formed with a first opening on an outer surface of the protective film material, and wherein the first opening is about 10 um or less in size.

16. The system of claim 15, wherein individual pores are formed with a first opening on an outer surface of the protective film material and a second opening on an inner surface of the protective film material, and wherein the second opening is larger than the first opening.

17. The system of claim 15, wherein the adhesive system comprises:
an inner adhesive layer attached to the core layer, the inner adhesive layer being made from a first adhesive;
an outer adhesive layer attached to the inner adhesive layer so that the outer adhesive layer is attachable to the stone surface, the outer adhesive layer being made from a second adhesive which is different from the first adhesive;
an installation gel which is applied between the stone surface and the outer adhesive layer to install the protective film material; and
wherein the installation gel brings the outer adhesive layer into an uncured state after contact with the outer adhesive layer whereby the outer adhesive layer fill surface pores on the store surface.

18. The system of claim 17, wherein the outer adhesive layer comprises crystallized acrylic acid, and wherein the installation gel reacts with the crystallized acrylic acid to bring the outer adhesive layer into an uncured state.

19. The system of claim 18, wherein the installation gel comprises methyldidecylamine, acetone, isopropyl alcohol, and cocamidopropyl betaine.

20. The system of claim 15, wherein the outer layer comprises crystallized limestone particles which are between about 20 nm and about 50 nm in size and which comprise between about 5 percent and about 12 percent of the outer layer by weight, and nitrile rubber resin particles which are between about 20 nm and about 30 nm in size and which comprise between about 3 percent and about 10 percent of the outer layer by weight.

* * * * *